(12) United States Patent
Hackl et al.

(10) Patent No.: US 7,436,080 B2
(45) Date of Patent: Oct. 14, 2008

(54) DEVICE FOR SUPPLYING POWER TO A TWO-VOLTAGE VEHICLE ELECTRICAL SYSTEM EQUIPPED WITH SAFETY-RELEVANT COMPONENTS

(75) Inventors: Stefan Hackl, Wackersdorf (DE);
Rainer Knorr, Regensburg (DE);
Günter Lugert, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 363 days.

(21) Appl. No.: 10/545,011

(22) PCT Filed: Jan. 14, 2004

(86) PCT No.: PCT/EP2004/000217

§ 371 (c)(1),
(2), (4) Date: Jan. 30, 2006

(87) PCT Pub. No.: WO2004/070911

PCT Pub. Date: Aug. 19, 2004

(65) Prior Publication Data

US 2006/0145536 A1    Jul. 6, 2006

(30) Foreign Application Priority Data

Feb. 10, 2003   (DE) ................................ 103 05 357

(51) Int. Cl.
*H02P 9/04*   (2006.01)

(52) U.S. Cl. ...................................... 290/40 C; 322/16

(58) Field of Classification Search ................ 290/40 R, 290/40 C, 40 B; 322/10, 16
See application file for complete search history.

(56) References Cited

U.S. PATENT DOCUMENTS

| | | | |
|---|---|---|---|
| 6,456,508 B1 * | 9/2002 | Namai et al. .................. 363/17 |
| 6,700,808 B2 * | 3/2004 | MacDonald et al. ......... 363/142 |
| 6,903,950 B2 * | 6/2005 | Afzal et al. .................. 363/142 |
| 6,919,648 B2 * | 7/2005 | Bolz et al. ................. 290/40 C |
| 6,937,490 B2 * | 8/2005 | MacDonald et al. ......... 363/142 |
| 7,057,376 B2 * | 6/2006 | Cook et al. .................. 323/207 |
| 2004/0112320 A1 | 6/2004 | Bolz et al. |

FOREIGN PATENT DOCUMENTS

| | | |
|---|---|---|
| DE | 198 55 245 A1 | 6/1999 |
| DE | 100 20 304 A1 | 10/2001 |
| DE | 101 03 951 A1 | 8/2002 |
| WO | 02/066293 A1 | 8/2002 |
| WO | 02/080334 A2 | 10/2002 |

* cited by examiner

*Primary Examiner*—Nicholas Ponomarenko
(74) *Attorney, Agent, or Firm*—Laurence A. Greenberg; Werner H. Stemer; Ralph E. Locher

(57) ABSTRACT

Device for supplying power to a two-voltage vehicle electrical system equipped with safety-relevant components with an integrated starter-generator mechanically coupled with an internal combustion engine BKM, a double-layer capacitor DLC, a first and second energy accumulator B1, B2, with power being able to be supplied to safety-relevant components V1s via three safety switches X1 to X3, alternately by the starter-generator ISG, the double-layer capacitor DLC, the first or the second energy accumulator B1, B2.

7 Claims, 2 Drawing Sheets

DEVICE FOR SUPPLYING POWER TO A TWO-VOLTAGE VEHICLE ELECTRICAL SYSTEM EQUIPPED WITH SAFETY-RELEVANT COMPONENTS

BACKGROUND OF THE INVENTION

Field of the Invention

The invention relates to a device supplying power to a two-voltage vehicle electrical system equipped with safety-relevant components, with a starter-generator coupled mechanically to an internal combustion engine, downstream of which a bidirectional AC/DC converter is connected, of which the DC terminal is connected via a first switch to a first accumulator, which supplies a first vehicle electrical system and its loads with power and via a second switch to a double-layer capacitor and to a bidirectional DC/DC converter with a second accumulator, which supplies a second vehicle electrical network and its loads with power.

A starter-generator in a motor vehicle can usually be operated at a voltage of 14V in a vehicle electrical system (more precisely 14.4V, that is the charge voltage of a 12V energy accumulator). The output power but also the generator power is technically usefully limited in this case to a maximum of 3 kW, since otherwise the electrical system currents would be too high. Although a starter-generator can start the internal combustion engine at a vehicle electrical system voltage of 14V and supply power for the electrical loads during the journey, for further functions involving consumption or output of electrical energy such as boost (accelerations) or recuperation (braking) a power of more than 3 kW is however required. This power can only be achieved with a higher vehicle electrical system voltage. 42V vehicle electrical systems (42V is the charge voltage of a 36V accumulator) are being developed which allow greater electrical power, for example around 6 kW.

An integrated starter-generator, abbreviated below to ISG, is for example embodied as a alternating current asynchronous machine with an electronic voltage converter which is installed in place of the flywheel directly on the crankshaft of the internal combustion engine In generator operation, driven by the internal combustion engine, in which it operates as an power source, it allows the generation of electrical power, and in motor operation, driving the internal combustion engine, the generation of mechanical drive power; it thus replaces both the known generator and also the usual starter. Since the available power is increasing significantly (6 kW compared to 2 kW with known generators), the ISG, in addition to starting the engine and supplying the electrical system, allows further functions such as a) Boost (accelerations): Boosting the torque of the internal combustion engine during the acceleration phase of the motor vehicle. The ISG has a maximum torque of appr. 200 Nm, this corresponds to approximately the torque of a 2-liter internal combustion engine (during the boost process currents of around 270A are needed for appr. 15 seconds) and b) Recuperation (regenerative braking): the ISG absorbs kinetic energy during braking of the motor vehicle by generating power. In this case currents of up to appr. 270A are generated for around 30 seconds.

During engine operation, i.e., when starting the internal combustion engine and in boost mode (acceleration) a starter-generator obtains its energy from at least one energy accumulator.

In generator operation the starter-generator is driven by the internal combustion engine and is thus in a position to recharge the energy storage device or devices. This can be done in normal operation with low power, but also for operation with increased power, for example in recuperation mode, at a power that can correspond to the maximum power output of the starter-generator.

These requirements demand an increased performance from the energy accumulator, which for example, for every 100,000 kilometers driven, must start the internal combustion engine around 200,000 times, provide the energy for the boost process and be able to accept the kinetic energy again.

Because of the fixed cycle characteristics of 200 full cycles of a low-cost lead-acid accumulator, with this type of usage a maximum distance driven of less than 10,000 kilometers can be expected, which is not acceptable.

For this reason the lead-acid accumulator is combined with a double-layer capacitor. Since the accumulator is now no longer subject to cyclic loads, a battery life in line with current standards can be expected.

Such a combination is known from WO 02/066293 A1 and is shown in FIG. 2. This Fig. shows the circuit diagram of a two-voltage vehicle electrical system (42V/14V) with a mechanically-coupled integrated starter-generator connected to an internal combustion engine, downstream from which is connected a bidirectional AC/DC-converter. The positive DC terminal of the AC/DC converter is a) connected via a first switch S1 to the positive pole of a 36V battery B1, which supplies a 42V vehicle electrical system with energy, with the large loads V1 lying in parallel to the 36V battery B1 (of which the other terminals are connected to the reference potential GND), and in a series circuit to the first switch S1 connected to a third switch S3 which leads to a bidirectional DC/DC converter 2, b) connected via a second switch S2 to the positive terminal of a double-layer capacitor DLC (of which the negative terminal is connected to the ground potential GND), and in a series circuit to the second switch S2 to a fourth switch S4, which leads in parallel to the third switch S3 to the bidirectional DC/DC converter 2. The other side of the DC/DC converter 2 leads to a 12V accumulator battery B2 which supplies the 14V vehicle electrical system with energy, with the small loads v2 lying in parallel with 12V accumulator B2 (of which the other terminals are connected to the reference potential GND).

The operational sequences executed by this circuit, especially the determination of the direction of operation of the converter (upwards or downwards conversion), the charging of the energy accumulator and the switch settings of the four switches S1 to S4 are controlled/regulated by an open-loop/closed loop control circuit which is not shown in the diagram.

As well as the known passenger comfort components (air conditioning, audio etc.) and the new very-high current applications (boost, recuperation), safety-relevant components with what are known as "x-by-wire" functions are being developed, for example an electromechanical braking system or an electrical vehicle steering system. Such safety-relevant components are not included in the known circuit as shown in FIG. 2. The failure of such a system, for example as a result of its power supply system failing, would have catastrophic results.

Therefore a separate power source is demanded for these types of safety-relevant components. This energy source can be supplied with power by the integrated starter-generator ISG or by the accumulator B1.

In general this is a somewhat smaller accumulator compared to the 36V-accumulator B1 which, in the event of the failure of the ISG or of B1, can take over the supply of power to the safety-relevant components for a defined period. The energy content and the "state of health" of this additional power source must naturally also be known!

If accumulators are not being constantly charged or recharged, a precise knowledge of their energy reserves is needed. Recording the energy reserves of an accumulator is difficult and complex. In addition the energy that can be obtained from accumulators is heavily dependent on the temperature and they can surprisingly and unpredictably fail completely.

Great expense is involved in providing such an additional power source. Since the power requirement for an accumulator, in relation to its size, is very high, the accumulator cannot simply be as small as possible, and to meet the demand for power must often be overdimensioned in energy terms.

The weight of such an additional accumulator is also often a limiting factor. Finally there are also the further costs of the accumulator and of monitoring it and the space requirement, which make this solution seem unattractive.

From DE 198 55 245 A1 a redundant power supply for electrical consumers, especially for safety-relevant consumers (electrically-operated brakes) is known, which features a first accumulator charged directly by an alternating current generator, and which in a first version charges the vehicle electrical system a safety-relevant load. A second accumulator, which is provided exclusively as an "emergency power supply" for safety-relevant loads, is charged by the alternating current generator via a DC/DC converter. Each of these two accumulators can be disconnected in the case of a short circuit or other error by a charge disconnection module from its power supply and can be disconnected from the load by a disconnection module and if necessary by an additional switch. For each further safety-relevant load two additional charge disconnection modules, two disconnection modules and if necessary two additional switches are necessary. In a second version the first and the second accumulator are provided exclusively to supply power to safety-relevant loads, with a further—third—accumulator being required to supply power to the vehicle electrical system.

Finally a power supply unit for electrical system-based safety-relevant system components of motor vehicles is known from DE 101 03 951 A1, which features three (or more) independent energy feeds, a connecting line to be opened and closed by a switch between each energy feed and each system component, as well as logic control units for the switches.

SUMMARY OF THE INVENTION

The object of the invention is to supply a simple and cost-effective device for secure energy supply of a two-voltage vehicle electrical system equipped with safety-relevant components, of which the costs, technical effort, space required and weight to not significantly exceed those of supplying power to a two-voltage vehicle electrical system without safety-relevant components and can manage without an emergency power supply for the safety relevant loads.

In accordance with the invention this object is achieved by a device with the features specified in claim 1.

The invention includes the technical disclosure of simplifying the circuit shown in FIG. 2 and of replacing the additional power source required for supplying power to the safety-relevant components with this simplified circuit, with the four available power sources (integrated starter-generator ISG, first accumulator B1, double-layer capacitor DLC and second accumulator B1) being able to take over directly the power supply to the safety-relevant components depending on availability. The safety is greatly increased by this measure since, instead of the required emergency power supply, three further such additional source of energy are assailable as alternative if the power supply for the safety-relevant components fails.

Only a few energy accumulators are in a position to provide such high numbers of cycles or such a high energy throughput as a double-layer capacitor. Its energy storage capability is however limited and not suitable for supplying vehicle electrical systems over a longer period.

Through the combination of accumulators as energy storage devices and double-layer capacitor DLC as cycle-resistant power storage the necessary energy and power can be made available for the ISG, so that this can employ its full performance for start/stop, boost and recuperated braking. In addition the DLC is a further source of energy for the safety-relevant components. This means that a total of four sources of energy are available to a two-voltage vehicle electrical system. This allows a redundant energy network to be constructed for safety-relevant components.

The operating voltage range of safety-relevant component is very large and can for example lie between 20V and 58V in a 42V vehicle electrical system.

Advantageous developments of the invention can be taken from the subclaims.

An exemplary embodiment in accordance with the invention is explained in more detail below with reference to a schematic drawing. The drawing shows the following:

DESCRIPTION OF THE PREFERRED EMBODIMENTS

Figure 2:
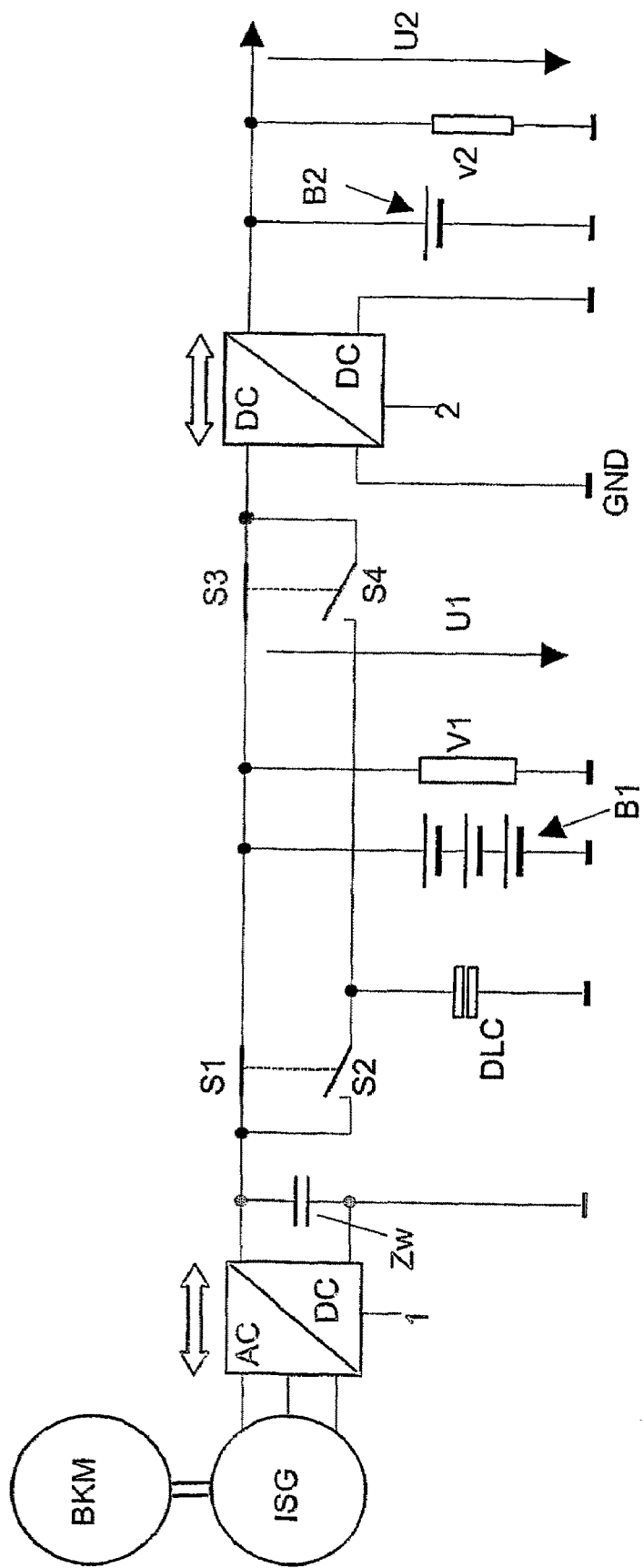

FIG. 2 has already been explained above.

Figure 1:
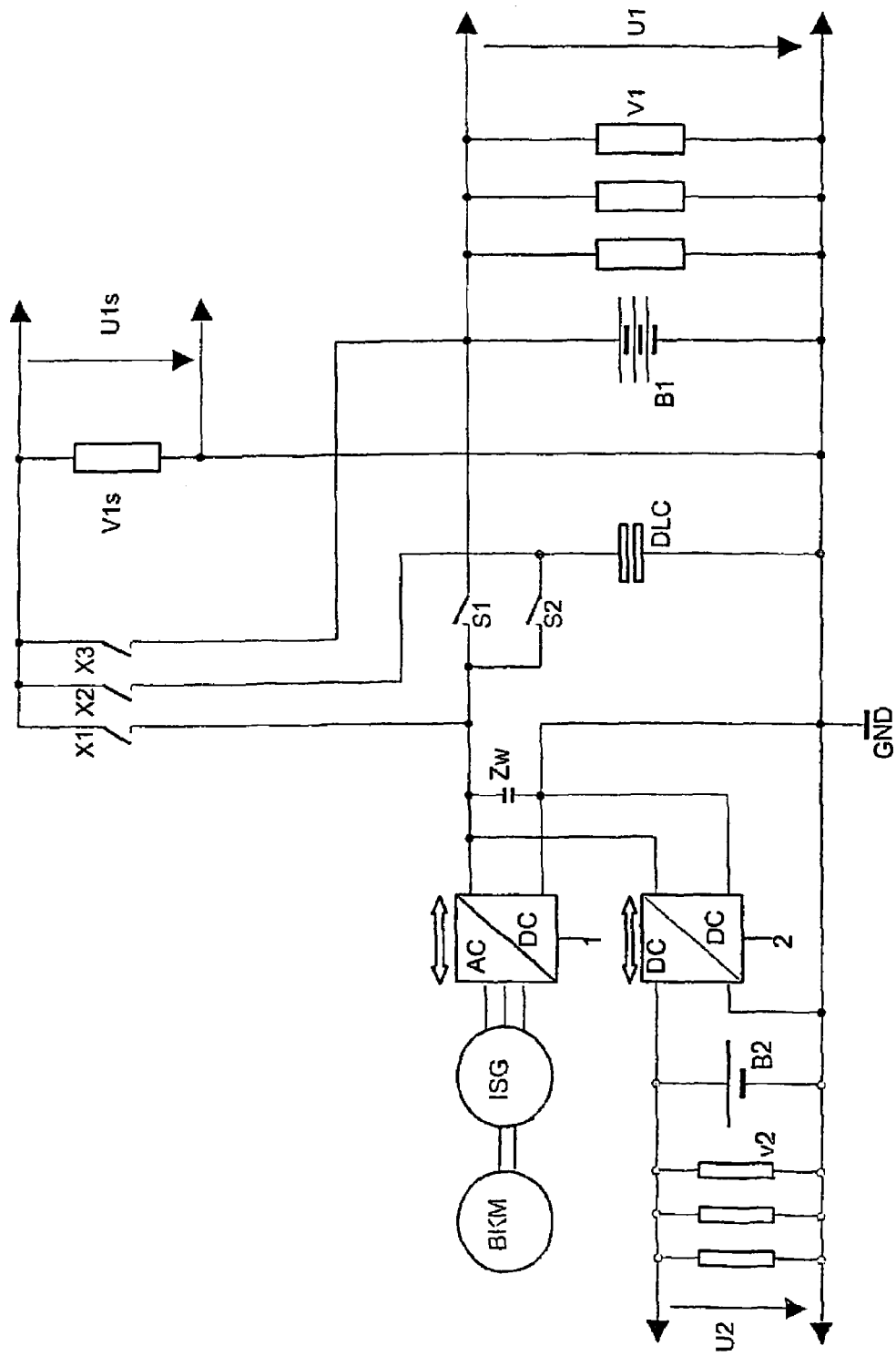
FIG. 1 the circuit of an inventive two-voltage vehicle electrical system with integrated starter-generator, double-layer capacitor and safety-relevant components, FIG. 2 the circuit of a known vehicle electrical system with a integrated starter-generator and double-layer capacitor.

FIG. 1 shows the circuit of an exemplary embodiment of a device in accordance with the invention for supplying power to a two-voltage vehicle electrical system (for example 14V/42V) with a starter-generator ISG, a double-layer capacitor DLC and with safety-relevant components V1s, for example an electromechanical brake.

The integrated starter-generator ISG linked to an internal combustion engine BKM is connected to a bidirectional AC/DC converter 1 and via this converter and a first switch S1 to a first accumulator B1 (36V) which feeds the larger loads V1 of the first vehicle electrical system (42V), and is connected via the AC/DC converter 1 and a second switch S2 to a double-layer capacitor DLC. A normal link capacitor Zw is arranged between the DC outputs of the AC/DC converter 1. To this extent the inventive circuit matches the known circuit from FIG. 2.

Unlike in FIG. 2, the AC/DC converter 1 is connected directly to the bidirectional DC/DC converter 2 and via this converter to the second accumulator B2 (12V) which feeds the smaller loads v2 of the second vehicle electrical system (14V). This allows both switch S3 and S4 to be dispensed with.

In addition a safety-relevant component V1s, for example an electromechanical brake, is provided. In accordance with the invention, this component is supplied with power alternatively:

a) by the integrated starter-generator ISG or by the second accumulator B2 via a first safety switch X1 from the connecting lead between the AC/DC converter 1 and the first switch S1, b) by the double-layer capacitor DLC via a second safety switch X2 from the connecting lead between the second switch S2 and the double-layer capacitor DLC, or c) from the first accumulator B1 via a third safety switch X3 from the positive terminal of the first accumulator B1.

Each load can be switched on and off by a switch connected in series with it, said switch not being shown to aid clarity in the diagram. The power supply leads to the relevant load groups (consumers) V1, V1s and v2 are provided with arrows which are intended to indicate that further loads can be connected.

The operating sequences which can be performed by means of the circuit shown in FIG. 1, especially the determination of the direction of operation of the converter (upwards or downwards conversion), the charging of the energy accumulators and the circuit settings of the switches S2, S1 and X1 to X1, are controlled/regulated by an open-loop/closed-loop control circuit not shown.

The inclusion of the double-layer capacitor DLC means that the load on both the first and also the second vehicle electrical system with lead-acid accumulators B1 and B2 is very much reduced.

The great advantage, as well as saving two switches, lies for the safety-relevant components of the inventive power supply in the fact that, for their alternative supply of power from the four available sources of energy ISG, DLC, B1 and B2 only three switches X1 to X3 are required and that these can be easily monitored. The accumulators are constantly recharged, which means that it can be assumed that they are constantly fully charged, and the double-layer capacitor DLC can be very easily checked. Its energy content is determined by simple voltage measurement. Its ageing state, unlike that of an accumulator, can also be easily determined by measuring voltage and internal resistance. Adverse affects on its performance by low temperatures can be ignored, with some capacitor types the performance even improves as the temperature decreases!

The upper and lower voltage limit (in accordance with the SICAN/VDA Recommendation) of 48V or 30V only relates to the voltage in the 42V vehicle electric system; These limits are complied with by the inventive device.

To increase the performance of the integrated starter-generator ISG and of the double-layer capacitor DLC, the voltage of these two components can be temporarily higher. The maximum voltage should however be less than 60V, that is the maximum permissible voltage at which no additional shock hazard protection is necessary.

A higher voltage at the double-layer capacitor DLC has the advantage that the integrated starter-generator ISG can provide a higher torque and the energy storage capacity of the double-layer capacitor DLC, which behaves quadratically to the voltage, increases. The result is an increase in power of the overall vehicle electrical system.

The double-layer capacitor DLC should be operated in the voltage range >30V . . . <60V. A higher voltage demands additional shock hazard protection (see above), a deeper discharge than to below 30V creates very high discharge currents while the load remains the same, with only a quarter of the stored energy being able to be absorbed which is to be maintained as the minimum constant energy reserve.

An electromechanical brake as a safety-relevant component, which can be operated over the entire voltage range of the double-layer capacitor DLC, needs an energy of around 1.4 Wh per braking process if the functionality of the vehicle electrical system is disturbed. For a power supply to the electromechanical brake from a double-layer capacitor with for example 115F, which has an energy reserve of 8 Wh, the energy reserve is sufficient for at least 5 braking processes.

Overall in the two-voltage vehicle electrical system (14V/42V), four sources of energy are available for supply of energy to safety-relevant components: Starter-generator ISG, double-layer capacitor DLC, accumulator B1 and accumulator B2.

With a 42V single-voltage vehicle electrical system, in which the DC/DC converter 2 and accumulator B2 with its consumers v2 are not present—the rest of the circuit is unchanged—there are three source of energy ISG, DLC and B1 available.

Each of these sources of energy is able to take over the power supply to the safety-relevant components V1s should the situation demand it. If a source of energy fails as a result of a malfunction/misdiagnosis, further sources of energy are available which can take over the power supply to the safety-relevant components V1s. A multiple redundancy is thus always produced, so an accumulator provided exclusively for the safety-relevant components V1s can be dispensed with, a major saving in cost and weight.

In the normal operation the accumulator B1 is charged up via switch S1, the double-layer capacitor DLC via switch S2 and the accumulator B2 via the DC/DC converter 2 by integrated starter-generator ISG in generating mode via the AC/DC converter 1. The safety-relevant components V1s are supplied with power via the 36V-accumulator B1 via the closed safety switch X3. Boosting and recuperative braking is undertaken in collaboration between the integrated starter-generator ISG and the double-layer capacitor DLC.

In a start process the integrated starter-generator ISG is supplied with power in the motor mode by the double-layer capacitor DLC or by the first accumulator B1 via switch S1 or S2 and the AC/DC converter 1 (which now converts direct current into alternating current).

In exceptional cases the double-layer capacitor DLC or the accumulator B1 can also be charged by accumulator B2 or accumulator B2 by the double-layer capacitor DLC or by the accumulator B1.

In such a vehicle electrical system errors or faults (short circuits or line interruptions) or misdiagnoses can occur. The results of short circuits of the sources of energy and the safeguarding of the energy supply of the safety-relevant components are to be investigated below.

With a short circuit of the first accumulator B1, in which the power supply of the first vehicle electrical system fails, the first switch S1 and the third safety switch X3 are controlled by the control/regulation circuit so that they do not conduct, to limit the area affected by this short circuit. The power to the safety-relevant components V1s can in this case a) by the integrated starter-generator ISG via the AC/DC converter 1 and the first safety switch X1, or b) by the second accumulator B2 via the DC/DC converter 2 and the first safety switch X1, or c) be supplied by the double-layer capacitor DLC via the second safety switch X2.

With a short circuit of the double-layer capacitor DLC, the second switch S2 and the second safety switch X2 are switched to non-conducting. The power to safety-relevant components V1s can a) by the first accumulator B1 via the third safety switch X3, or c) by the integrated starter-generator ISG via the AC/DC converter 1 and the first safety switch X1 or c) by the second accumulator B2 via the DC/DC converter 2 and the first safety switch X1.

With a short circuit at the output of the AC/DC converter 1, the first switch S1, the second switch S2 and the first safety switch X1 are switched to non-conducting. The power to safety-relevant components V1s can a) be supplied by the first accumulator B1 via the third safety switch X3, or b) by the double-layer capacitor DLC via the second safety switch X2.

With a short circuit of the second energy accumulator B2, in which the second vehicle electrical system fails, power can be supplied to the safety-relevant components V1s a) by the first accumulator B1 via the third safety switch X3, or b) by the double-layer capacitor DLC via the second safety switch X2, or c) by the integrated starter-generator ISG via the AC/DC converter 1 and the first safety switch X1.

It can be seen from this investigation that, with a short circuit of an energy accumulator in the two-voltage vehicle electrical system there are always two to three energy sources still available to supply power to the safety-relevant components. With a line interruption there are likewise at least two sources of energy to supply power to the safety-relevant components, as can be seen from FIG. 1 for a given line interruption.

In this case with this investigation only the direct connections of the operable sources of energy to the safety-relevant components are taken into account, and not the possible diversions (e.g. from accumulator B1 via S1 and X1).

The behavior is similar with double errors or faults (one short circuit, one interruption or two short circuits or two interruptions) and with triple errors, as can be seen from FIG. 1. At least one intact source of energy to supply the safety-relevant components always exists.

The only error with which the supply of power to the safety-relevant components breaks down completely, is that in which the accumulator B1 and double-layer capacitor DLC simultaneously fail through short circuits and a short circuit or an interruption occurs at the output of the AC/DC converter 1.

The likelihood of this type of error is however insignificantly small compared to the assumption that an additional accumulator for feeding the safety-relevant loads V1s will fail.

The control/regulation circuit for activating the switch not shown in the diagram always evaluates the required and actual charge states of the energy sources, and monitors the integrated starter-generator ISG and the two converters 1 and 2.

Viewed overall, the additional effort for the inventive device for supplying power to a two-voltage vehicle electrical system equipped with safety-relevant components compared to the known device for supplying energy to a two-voltage vehicle electrical system without safety-relevant components—on dispensing with two switches S3, S4 and additionally three switches X1, X2, X3—consists of a single switch, which does not increase either costs or also technical effort, space requirement and weight by a significant amount.

We claim:

1. Device for supplying energy to a two-voltage vehicle electrical system with an integrated starter-generator (ISG) mechanically coupled to an internal combustion engine (BKM), downstream from which is connected a bidirectional AC/DC-converter, of which the DC terminal is connected via first switch (S1) to a first accumulator (B1) which supplies a first vehicle electric system and its loads (V1) with power, and is connected via a second switch (S2) to a double-layer capacitor (DLC), is connected to a bidirectional DC/DC converter (2), downstream from which a second accumulator (B2) is connected, which supplies a second vehicle electrical system and its loads (v2) with power, and with a control/regulation circuit, which controls/regulates the operational sequences of this device—the determination of the direction of operation of the converters (1, 2), the charging of the sources of energy (B1, B2, DLC) and the switch positions of all switches, characterized in that the bidirectional DC/DC converter (2) is directly connected to the DC terminal of the bidirectional AC/DC converter (1), a first safety switch (X1) is provided, via which power is supplied to safety relevant components (V1s) by the integrated starter-generator (ISG) via the bidirectional AC/DC converter (1) or alternatively by the second accumulator (B2) via the bidirectional DC/DC converter (2), a second safety switch (X2) is provided, via which power is supplied to safety-relevant components (V1s) by the double-layer capacitor (DLC), and a third safety switch (X3) is provided, via which power is supplied to safety-relevant components (V1s) by the first accumulator (B1).

2. Device in accordance with claim 1, characterized in that, in normal operation, i.e., when the integrated starter-generator (ISG) is operating as a generator, power is supplied to safety-relevant components (V1s) by the first accumulator (B1) via the third safety switch (X3).

3. Device in accordance with claim 1, characterized in that, with a short circuit of the first accumulator (B1) the first switch (S1) and the third safety switch (X3) are made non-conducting and power is supplied to safety-relevant components (V1s)

a) by the integrated starter-generator ISG via the Ac/DC converter 1 and the first safety switch X1, or b) by the second accumulator (B2) via the DC/DC converter (2) and the first safety switch (X1), or c) by the double-layer capacitor (DLC) via the second safety switch (X2).

4. Device in accordance with claim 1, characterized in that, with a short circuit of the double-layer capacitor (DLC) the second switch (S2) and the second safety switch (X2) are made non-conducting and power is supplied to safety-relevant components (V1s)

a) by the first accumulator (B1) via the third safety switch (X3), or c) by the integrated starter-generator ISG via the AC/DC converter 1 and the first safety switch X1), or c) by the second accumulator B2 via the DC/DC converter 2 and the first safety switch (X1).

5. Device in accordance with claim 1, characterized in that, with a short circuit at the output of the AC/DC converter (1) the first switch (S1), the second switch (S2) and the first safety switch (X1) are made non-conductive and power is supplied to safety-relevant components (V1s)
   a) be supplied by the first accumulator B1 via the third safety switch X3, or
   b) by the double layer capacitor DLC via the second safety switch X2.

6. Device in accordance with claim 1, characterized in that, with a short circuit of the second energy accumulator (B2), power is supplied to the safety-relevant components V1s
   a) be supplied by the first accumulator B1 via the third safety switch X3, or
   b) by the double-layer capacitor DLC via the second safety switch X2, or
   c) by the integrated starter-generator ISG via the AC/DC converter 1 and the first safety switch X1.

7. Device in accordance with claim 1, characterized in that it is provided for supplying power to a two-voltage electrical system in a vehicle.

* * * * *